United States Patent [19]

Nagamori

[11] Patent Number: 5,592,663

[45] Date of Patent: Jan. 7, 1997

[54] GRAPHING METHOD AND APPARATUS FOR DATA BASE RETRIEVAL

[76] Inventor: Nobuhiko Nagamori, 5-5-13, Kunugidaidanchi, 1404, Kawashima-cho, Hodogaya-ku, Yokohama-shi, Kanagawa 240, Japan

[21] Appl. No.: 168,219

[22] Filed: Dec. 17, 1993

[51] Int. Cl.⁶ .................................................. G06F 17/30
[52] U.S. Cl. ...................... 395/605; 364/488; 364/283.4; 364/DIG. 1
[58] Field of Search ................................. 395/600, 100, 395/575; 364/468, 401, 488

[56] References Cited

U.S. PATENT DOCUMENTS

| | | | |
|---|---|---|---|
| 4,769,636 | 9/1988 | Iwami et al. | 395/158 |
| 4,829,446 | 5/1989 | Draney | 364/488 |
| 4,843,569 | 6/1989 | Sawada et al. | 382/24 |
| 4,845,634 | 7/1989 | Vitek et al. | 364/468 |
| 4,847,788 | 7/1989 | Shimada et al. | 395/135 |
| 4,882,679 | 11/1989 | Tuy et al. | 364/413.22 |
| 5,053,956 | 10/1991 | Donald et al. | 364/401 |
| 5,184,306 | 2/1993 | Erdman et al. | 395/119 |
| 5,278,946 | 1/1994 | Shimada et al. | 395/62 |
| 5,412,774 | 5/1995 | Agrawal et al. | 395/600 |
| 5,414,809 | 5/1995 | Hogan et al. | 395/155 |
| 5,421,008 | 5/1995 | Banning et al. | 395/600 |
| 5,448,696 | 9/1995 | Shimada et al. | 395/161 |
| 5,455,945 | 10/1995 | VanderDrift | 395/600 |

*Primary Examiner*—Thomas G. Black
*Assistant Examiner*—C. Pham
*Attorney, Agent, or Firm*—Ronald R. Snider

[57] ABSTRACT

The purpose of the present invention is to provide a graphical user interface which enables to show with graphs, as in FIG. 1, the quantity of and the logical relation between the sets of the database retrieved, to calculate and manipulate the sets by pointing the area of the rectangular shapes of the graphs, and to extract the data by pointing the area of the rectangular shapes of the graphs. The program of the present invention communicates with the database query language program through message exchanges between the programs or message exchanges at the terminal systems connected with the communication network, generates the retrieval instructions of the query language program by way of set creating, set drawing, set selection, set projection, and set extraction, and performs the input operation in place of the user. The present invention facilitates simple retrieval processing and supports logical thinking of the user to evaluate and judge the quantity of the set and the relation between the sets.

20 Claims, 15 Drawing Sheets

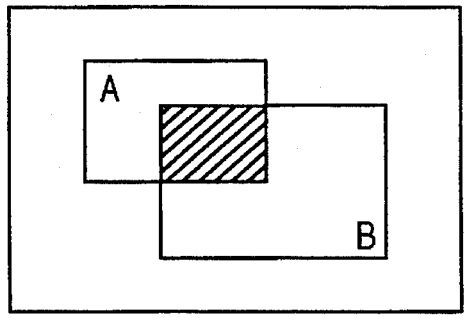
FIG. 3a 'A'+B
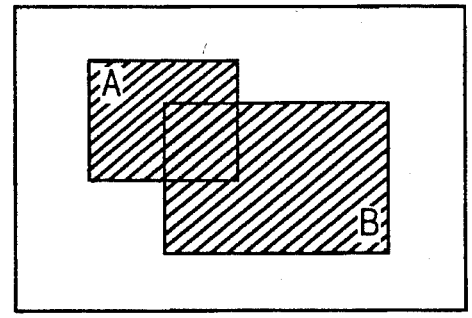
FIG. 3b 'A'+B
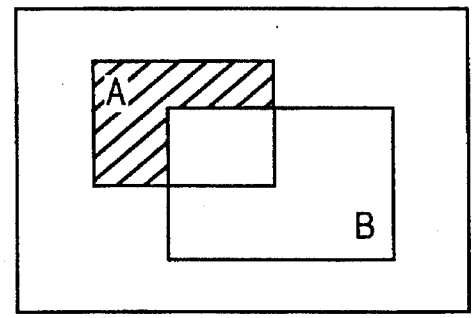
FIG. 3c 'A' - ('A' * 'B')
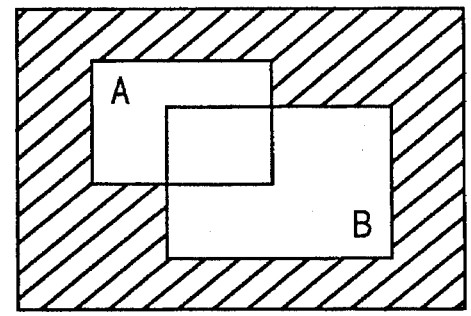
FIG. 3d '#' - ('A' + 'B')

'A' * 'B' ≠ 0
'A' * 'C' ≠ 0
'B' * 'C' ≠ 0
'A' * 'B' * 'C' ≠ 0

'A' * 'B' ≠ 0
'A' * 'C' ≠ 0
'B' * 'C' ≠ 0
'A' * 'B' * 'C' = 0

'A' * 'B' = 0
'A' * 'C' ≠ 0
'B' * 'C' ≠ 0

'A' * 'B' ≠ 0
'A' * 'C' = 0
'B' * 'C' = 0

'A' * 'B' = 0
'A' * 'C' = 0
'B' * 'C' = 0

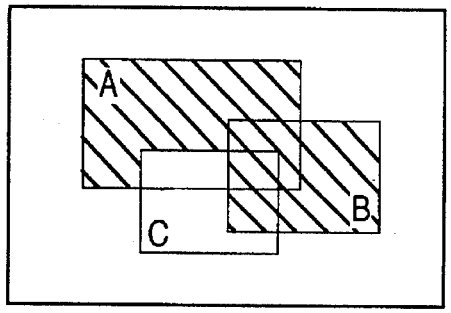

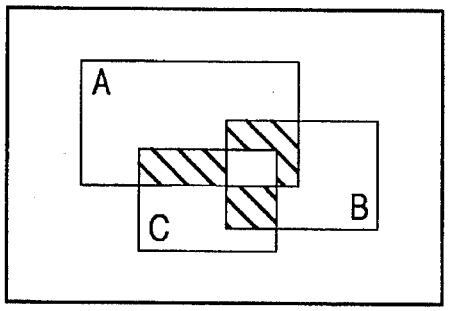

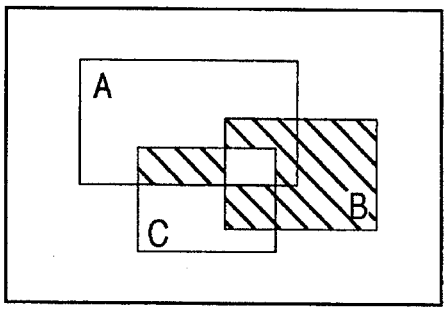

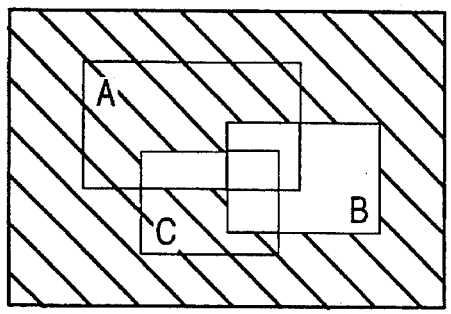

GRAPHING METHOD AND APPARATUS FOR DATA BASE RETRIEVAL

BACKGROUND OF THE INVENTION

1. Field of the Invention

The present invention relates to a database retrieval method, utilizing a personal computer system or a workstation system, equipped with a graphical display unit and a pointing equipment like a mouse, in commercial database services, application database utilization within the industries, and personal database utilization.

2. Description of the Prior Art

In the conventional database retrieval method, retrieval conditions are generally specified with a set of query language program instructions provided by a database system, then input by a keyboard unit, and the count and data elements of the retrieved set which satisfies the specified condition are output as a response message in characters, to a display unit, such as CRT.

In the database retrieval, there are a mental and logical problem in recognizing objects and an operational and technical problem to operationally obtain the object in question.

The logical objective is to ultimately create the optimum retrieval condition to eliminate the target object more precisely, through creating a concrete retrieval condition to eliminate the set by analyzing abstract requirements of the object in question, by the knowledge and understanding of the area of the object, and determining the set in the database in question, and by evaluating and reflecting the set obtained as a result of the retrieval.

The technical objective is to master computer manipulation and to skillfully write and input a set of query language instructions to retrieve the target object, with the information on the database structure, like file names and field names, and the knowledge on the grammar and usage of such a query language.

SUMMARY OF THE INVENTION

The present invention aims (1) to project in geometric graphs the quantity of the retrieved set of database and the logical relations among the sets as in FIG. 1, (2) to calculate and manipulate the sets by simply indicating the rectangular regions in graphs, (3) to provide a graphical user interface to realize to extract the data by indicating the rectangular region in the graph, and (4) to provide a retrieval method to solve both the above stated logical objective and technical objective in an integrated approach.

In order to achieve the above stated objectives, the present invention provides the program to execute the instructions to access the database system in place of the user who manipulates such a query language program provided by a database management system, in an environment of a computer system comprising a graphical display unit and a pointing equipment, such as a mouse.

Accordingly, a database retrieval method in processing of obtaining the count of retrieved set databases and reading the set data elements according to the present invention, comprising:

(a) A set creating means to register a set retrieval condition and the number of hit elements as an integrated abstract object, i.e. a set object, (b) A set drawing means (1) to select up to 3 set objects among pre-registered set objects, and (2) to display on the screen of a graphical display unit, the count of the sets and a logical relationship among the sets as graphs mapped in a geometric rectangular region, (c) A set selection means (1) to indicate the drawn rectangular regions and cut portions of such regions with a mouse or an equivalent pointing means, and (2) to structure a logical set of such rectangular regions and cut portions, (d) A set projection means to project the set object and the set logically structured by the set selection means, to other database file elements, and (e) A set extraction means to extract the set object and the data elements of the set logically structured by the set selection means.

As illustrated in FIG. 2, the present invention is realized in a system configuration (2-$a$) where the program of the present invention and the database system work on a set of personal computer system or a work-station computer system, or another system configuration (2-$b$) where a personal computer system or a work-station computer system on which the program of the present invention operates is connected via a communication network as a terminal system of a mainframe computer where the database system is installed.

The present invention provides a concrete means based on the below-described objects, and manages and controls the internals of the programs.

(A) Space Object

In a space object, a rectangular frame of a pre-specified dimension is drawn on a screen of the graphical display unit, representing the database file or a user view of the mother set which is the object of retrieval. Rectangular regions represent the sets within the rectangular frame, which ultimately shows a topological space representing the existence of the retrieved data.

The space object is described with a space definition statement (A-1), which comprises specific ID numbers, space object names, database nodes, database file names and a query language program name connected with commas, and with a multiple field object definition statements (A-2) which comprise field object names, data formats, data length, and database field names connected with comas, and a maximum of 32 space objects can be defined.

(A-1) Example of a space definition statement
001,employee,Host,EMP,SQL (A-2) Example of field object definition statements
personal_id,number(12),PERSONAL_NO
name,char(30),NAME
age,integer,AGE
birthday,date,BIRTHDAY
address,char(40),ADDR_1

The space object allows to represent reciprocatively set elements among the space objects by defining in a space connecting definition statement (A-3) the fields that have common values to allow one-to-one correspondence of set elements. A space connecting definition statement is described with a space object name_1, field name_1, space object name_2 and field name_2, connected with commas.

(A-3) Example of a space connecting definition statement
employee.personal_id,personal_history.h_emp_id

(B) Set Object

A set object is a retrieved database set, representing the formula and the count of sets as an integrated unity, and is described with an identifier, a conditional attribute and a numeric attribute. And it is managed by a unit of space object with a specific identifier.

The characters 'A' through 'Z', and 'a' through 'z' are automatically assigned as set object identifiers in the ascending order, but when a specific set object needs to be identified explicitly, up to 4 digits alpha-numeric characters in double quotation marks can be used as set object identifiers upon describing creation of set objects (B-3).

A set object conditional attribute is described with a set conditional script (B-1) or a set propositional logical formula (B-2).

(B-1) Example of a set conditional script
age>30 and age≦35

(B-2) Example of a set propositional logical formula
<+>(('A'*'B')+('A'*'C')+('B'*'C'))<–>('A'*'B'*'C')

The set conditional script is to describe the retrieval condition in a query language program command, and comprises a key field as a key for retrieval and a relational operator which denotes the retrieval condition.

The set propositional formula describes true or false of the proposition, first comprising an affirmative logical sign '<+>' denoting the logical condition of a set logical formula (B-3) is "ture," referenceing the set conditional script with the set object identifier, and a negative logical sign '<–>' denoting the logical condition, is "false". The set logical formula is described with set object identifiers connected with a logical union sign '+', a logical difference sign '–' and a logical intersection sign '*', to describe logical sets. The total number of database files, i.e. the mother set, is notified with '#'.

(B-3) Example of a set logical formula
('A'–(('A'*'B')+('A'*'C')))

A set object which comprises a set conditional script is called a primitive set object (B-4), and a set object which comprises a set propositional logical formula is called a deductive set object (B-5).

(B-4) Example of a primitive set object
1,'A',age>30 and age≦35

(B-5) Example of a deductive set object
2,"X",<+>(('A'*'B')+('A'*'C')+('B'*'C'))<–>('A'*'B'*'C')

The first numeric character in the set object is used to identify the primitive set object ('1') or the deductive set object ('2').

(C) Region object

A region object has a rectangular region of the space object as a drawing space, and one set object is projected as one rectangular region, and in the region object, the volume of the set is shown with the dimension of the region, and the logical relation among sets are projected as the layout of the regions as shown in FIG. 3. The logical intersection of two sets is projected as the region where two region objects overlap (3-a), and the logical union is the area surrounded by the outline (3-b), the logical difference is the cut portions of the region objects (3-c), and the mother set excluding the retrieved sets are the surrounding area of the logical union (3-d) within the space object. The cut portions obtained by the intersection of the region objects are described with a set logical formula (C-1), denoted with an identifier and a logical operator of the set objects.

(C-1) Example of a set logical formula describing a union of two cut portions of the region objects.
('A'–(('A'*'B')+('A'*'C')))+('B'–(('A'*'B')+('B'*'C')))

(D) Set Graph

The graph drawn with the region object which is a projection of the set object in the rectangular region representing the space object, is called a set graph (FIG. 1).

Up to three sets can be drawn in the space object at the same time, and as a result of various logical multiplication of the sets, the number of cut portions created by the intersection of three region objects, becomes seven (4-a), six (4-b), five (4-c), four (4-d), and three (4-e) as shown in FIG. 4. In case of three set graphs, a maximum of eight logical sets can exist, including the mother set, and with a combination of such eight portions of sets 255 different retrieval condition formulae can be created.

In the program which realizes the present invention based on the above stated object idea, an operation panel called a "control panel" on the screen of the graphical display unit is drawn as in FIG. 5.

The control panel comprises (1) a rectangular region representing the space object (5-1), (2) a field object browser (5-2) where the field objects defined in the space object are displayed for selection, (3) a set object browser (5-3) where set objects are displayed for selection, (4) a message box (5-4) where the user can enter instructions from the keyboard unit and the output message from the program is displayed, (5) a notifying field (5-5) where any guideline or warning or error message is displayed, and (6) five operational buttons for the user to execute processing by clicking it with a mouse. These buttons are a set creation button (5-6), a set drawing button (5-7), a set selection button (5-8), a set projection button (5-9), and a set reading button (5-10).

Additionally, in order to display the status of the operation and the information on the environment, a log window (5-11) is provided which records and displays in a real time mode, the instructions issued in the course of processing, the internal processing and the communication status with the query language program. The operation panel further displays, in windows, the number of data elements of the drawn sets of the region objects (5-12), the number of dots per element of the pointed set in the graphical display unit (5-13), the mode of drawing (5-14), the space object name (5-15), the count of the data elements of the mother set (5-16), the data base node (5-17), the query language program name (5-18), and the count attribute of the data elements of the set objects and sub-set objects (5-19).

When starting the program of the present invention, the database file is opened based on the space object definition information defined for each user's identification code.

Upon clicking the space object name (5-15) in the space object browser, the user can select the desired space object.

The program of the present invention has a specific set of instructions called a "Set Graph retrieval language" and execution of various functions displayed on the control panel is first translated in the "Set Graph retrieval language" for subsequent processing.

The internals of the program consist of modules as shown in FIG. 6, and these modules are processed by internal instructions called object messages written in the Set Graph retrieval language. Various functions are executed non-procedurally (in the directions shown with arrows in FIG. 6) with the object messages as the input.

In the present section and afterwards, the below stated space object definitions and created set objects are explained as examples.

Space object name: "employee"
employee record 1,employee,Host,EMP,SQL
personal_id,number(8),PERSONAL_NO
name,char(40),NAME
age,integer,AGE
birthday,date,BIRTHDAY
address,char(40),ADDR_1
tel,char(12),TEL_NO
years,integer,YEARS
dept_no,number(4),DEPT_CODE
proj_no,number(4),PROJ_CODE Space object name: "personal_history"
personal history record
2,personal_history,Host,TECH_HISTORY,SQL
h_emp_id,number(8),EMP_NO
h_keyword,char(20),SYSTEM
h_from_date,date,START_DATE
h_to_date,date,FINISH_DATE
h_description,char(255),DESC Statement to define space object linkage
employee.personal_id,personal_history.h_emp_id A group of set objects of the space object "employee"
1,'A',age>30 and age≦35
1,'B',years>12
1,'C',proj_no is null
1,'E',dept_no=100
2,"X",<+>(('A'*'B')+('A'*'C')+('B'*'C'))<->('A'*'B'*'C')
2,'D',2:['A']
2,'F',<+>('A'+'B')<->('A'*'C')<+>('A'*'B'*'C')

A set object of the space object "personal history"
1,'A',h_keyword='UNIX'

(a) Set Creation means

Enter in the message box (5-4) a retrieval conditional script (a-1) in which a key field as the key for retrieval and a corresponding conditional value are connected with a relational operator, and click the set creation button (5-6). The field name can be selected from the field object browser (5-3), with a click of the mouse.

(a-1) Input example of a retrieval conditional script
age>30 and age≦35

(b) Set Drawing means

Upon selecting up to three set objects from the set object browser (5-3) with a click of the mouse, set object identifiers (b-1) are displayed in the message box (5-4). Then, click the set drawing button (5-7).

(b-1) Input example of selected set object identifiers
'A','B','C'

(c) Set Selection means

Click and select the area of set graph region objects. If the target set consists of plural region objects, or of logical union of cut portions of the region object, select the desired portion of objects consecutively while pushing the shift key. Then, a set logical formula (c-1) is shown in the message box (5-4), so click and select the set selection button (5-8).

The numeric value that appeas after the equal sign at the end of the set logical formula, shows the count of the data obtained.

(c-1) Example of a set logical formula displayed after clicking the region objects
('A'-(('A'*'B')+('A'*'C')))+('C'-(('A'*'C')+('B'*'C')))+
('B'-(('A'*'B')+('B'*'C')))=85

(d) Set Projection means

A logical set to be projected is selected either from the set object browser (5-3), or from the set graphs with the set selection means, and click the set projection button (5-9) while the selected set object identifier or the set propositional logical formula is displayed in the message box (d-1).

(d-1) Example of a projected set object identifier or the set propositional logical formula
'A' or
<+>(('A'*'B')+('A'*'C')+('B'*'C'))<->('A'*'B'*'C')

When the set projection button changes to "OK?" button, the space object browser which displays a list of projectable space objects, is displayed in the window of the field object browser. Click and select the desired space object name with the mouse, and, at the same time, click "OK?" button while the selected space object name is displayed in the message box (d-2).

(d-2) Example of a projectable space object name
employee

(e) Set Extracting means

A logical set to be extracted is selected from the set object browser (5-3) or from the set graphs with the set selection means, and the set reading button (5-10) is clicked while the selected set object identifier or the set propositional logical formula (e-1) is displayed in the message box (d-2).

(e-1) Example of an extracted set object identifier or the set propositional logical formula
'D' or <+>'A'<->(('A'*'B')+('A'*'C'))

When the set reading button changed to "OK?", a group of fields to be extracted from the object browser (5-2) are clicked and selected with the mouse, and while the selected fields are displayed in the message box (e-2), "OK?" button is clicked.

(e-2) Example of extracted set field object names
personal_id, name, age, dept_no, The function of the present invention will be described below.

(a) Set creation function

With a click of the set creation button, a retrieval conditional script (a-1) displayed in the message box is obtained, and a set creation object message (a-2) is created which is converted to a set graph retrieval language.

(a-1) Example of a retrieval conditional script
age>30 and age≦35

(a-2) Example of a set creation object message
createSet 'A' where age>30 and age≦35.

The set creation object message is converted to a retrieval instruction of the query language program defined in the space object in the query language instruction generation module, and is transmitted to the query language program via the query language communication interface module.

The message received from the query language program is analyzed by the query language communication interface module, and the count of the hit data are reported to the set creation module. In the set creation module, the retrieval conditional script is recorded in the set conditional attribute, and the count of the hit data is recorded in the set count attribute. Then a specific identifier unique in the space object is given and registered.

The set drawing object message (a-3) is executed which draws the created set object as a set graph.

(a-3) Example of the set drawing object message executed by the set creation function
drawSet 'A' by rate.

(b) Set drawing function

With a click of the set drawing button, the set object identifiers (b-1) displayed in the message box are obtained, and a set drawing object message (b-2) is created.

(b-1) Example of set object identifiers to be drawn
'A','B','C'
(b-2) Example of a set drawing object message
drawSet 'A','B','C' by fit.

When a multiple set objects are specified, the logical intersection among the selected objects is automatically verified. The count of logical intersections of the set objects is obtained through creating the set objects of the logical intersection from the set object conditional attributes, and retrieving the created objects. The conditional formula and the count of responses of this logical intersection set is called a sub-set object (b-3), and it is maintained and utilized respectively while the session continues.

(b-3) Example of an object message which creates a sub-set object
createSubSet 'A'*'B'

Set graphs can be drawn in three modes, rate, fit and zoom modes.

The rate mode allows to draw the set graph of the region object in a size proportional to the mother set, in other words, the number of set object elements against the space object elements is in the same ratio as the dimension of the region object against the space object dimension.

The fit mode allows to draw all the region objects in the optimum size that can be drawn in the drawing frame. It makes easier to make quantitative comparison between sets and to understand the logical relations between the sets.

The zoom mode allows to draw the re-drawn set graphs twice as large as the original set graphs each time they are re-drawn, based on the initial ratio size as 1. It makes easier to see the details of the set graphs.

(c) Set selection function

With a click of the set selection button, the set logical formula (c-1) is obtained, selected and structured from the region object in the message box, then converted to a set propositional logical formula (c-2) by "set tautology" and displayed in the message box.

At the same time, a set selection object message (c-3) is created.

(c-1) Example of a set logical formula, selected and structured from the region object.
(('A'*'B')–('A'*'B'*'C'))+(('B'*'C')–('A'*'B'*'C'))+ (('A'*'C')–('A'*'B'*'C'))=85
(c-2) Example of a set propositional logical formula displayed in the message box.
<+>(('A'*'B')+('A'*'C')+('B'*'C'))<–>('A'*'B'*'C')
(c-3) Example of a set selection object message
selectSet    <+>(('A'*'B')+('A'*'C')+('B'*'C'))<–>('A'*'B'*'C')

The set selection function determines the logical set, executes "set tautology" and creates a set propositional logical formula which is used as the input for set creation, set projection and set extraction functions. With a click of the set creation button while the set propositional logical formula (c-2) is displayed in the message box, the set creation object message (c-3) is executed and a deductive set object (c-4) is created.

(c-4) Example of an object message which creates a deductive set object
createSet "X" with <+>(('A'*'B')+('A'*'C')+('B'*'C')) <–>('A'*'B'*'C')

(d) Set projection function

With a click of the set projection button, the set object identifier (d-1) or the set propositional logical formula displayed in the message box is obtained. Then, with a click of "OK?" button, the space object name (d-2) displayed in the message box to project the set graph, is obtained, and a set projection object message (d-3) is created.

(d-1) Example of the set object identifier
'A'
(d-2) Example of the space object name to project the set graph
employee
(d-3) Example of a set projection object message
projectset 'A' to 1:employee The object message executes the space selection object message (d-4) to alter the space object to project the set graph, and after the space object displayed in the screen is altered, executes the set creation object message (d-5). The conditional attributes of the set object to be created by the set projection function are the same as the original conditional attributes, preceded with the original space object number.

(d-4) Example of the space selection object message
selectspace personal_history.
(d-5) Example of the set creation object message
createSet 'D' with 2:['A'].

The set creation object message executed by the set projection object message is transmitted to the sub-module of the query language instruction creation module, defined in the space object to project the set graph.

(e) Set extraction function

With a click of the set reading button, the set object identifier or the set propositional logical formula (e-1) displayed in the message box is obtained. Then, with a click of "OK?" button, the field object name (e-2) to be extracted, displayed in the message box, is obtained, and a set extraction object message (e-3) is created.

(e-1) Example of the set propositional logical formula
<+>(('A'*'B'*'D')+('A'*'C'*'D')+('B'*'C'*'D')) <–>('A'*'B'*'C'*'D')
(e-2) Example of the field object name to be extracted
personal_id, name, age, dept_no,
(e-3) Example of a set extraction object message
readSet    <+>(('A'*'B'*'D')+('A'*'C'*'D')+ ('B'*'C'*'D'))<–>('A'*'B'*'C'*'D') [name, age, dept_no, proj_no ].

The set extraction object message is transmitted to the query language instruction creation facility, and after being converted into retrieval statement of the query-language, transmitted to the query language program via the query language communication interface module. The response received from the query language program is analyzed by the query language interface, and the extracted data is returned to the set extraction instruction module. The extracted data is displayed in the data displaying window.

(f) "Set tautology" function

By selecting the set graph region objects in a desired order, the logical sets structured with the same region objects, as shown in FIG. 7 (7-a), can be described in different set logical formulae (f-1, f-2). Also the set logical formula which describes the cut portions of the region objects is synthesized, so the element descriptions of the logical intersection sets sometimes overlap, or the descriptions self-containing the sets exist.

Accordingly, the "set tautology" function enables to convert such an un-fixed and redundant set logical formula into a set propositional logical formula (f-3) to explicitly describe the proposition by changing the order of the elements and calculating the logics of the elements.

(f-1) Example of the set logical formula (1)

$$('B' - (('A'*'B') + ('B'*'C'))) + (('B'*'C') - ('A'*'B'*'C')) +$$

$$('A' - (('A'*'B') + ('A'*'C'))) + (('A'*'B') - ('A'*'B'*'C')) +$$

$$('A'*'B'*'C') = 255$$

(f-2) Example of a different set logical formula (2) with the same proposition as the above set logical formula (1)

$$('A'*'B'*'C') + (('B'*'C') - ('A'*'B'*'C')) + (('A'*'B') -$$

$$('A'*'B'*'C')) + ('B' - (('A'*'B') +$$

$$('B'*'C'))) + ('A' - (('A'*'B') + ('A'*'C'))) = 255$$

(f-3) Example of a set propositional logical formula
<+>('A'+'B')<–>('A'*'C')<+>('A'*'B'*'C')

In the set propositional logical formula (f-3), the logical set in the left part of the formula is larger than that of the right part, being connected alternately with a sign <+> which denotes the affirmative logic and a sign <–> which denotes the negative logic. It describes step by step that, from "a large set to eliminate this portion" but "not to eliminate this much smaller portion contained in the eliminated portion." This descriptive style enables the user to recognize the proposition of the set with ease, and at the same time allows conversion to the database retrieval statement provided by the common database query language program.

The set logical formula (f-5) comprises the deductive set object (f-4), and are expanded after replacing the identifier of the deductive set object with the primitive set object identifier. Then the "set tautology " is performed and the set propositional logical formula (f-6) is structured.

(f-4) Example of the deductive set object
2,'F',<+>('A'+'B')<–>('A'*'C')<+>('A'*'B'*'C')

(f-5) Example of the set logical formula which comprises the deductive set object
'E'*'F'

(f-6) Example of the set propositional logical formula
<+>(('A'*'B'*'E')+('B'*'C'*'E'))<–>('A'*'B'*'C'*'E')

FIG. 7 shows a figure of the logical set structured by selecting the region objects, the set logical formula describing that logical set, and the result of the set propositional logical formula created by the "set tautology".

(g) Query language instruction generating function

With this query language instruction generator, retrieval instructions of the query language program are generated from the input object message. The query language instruction generator has separate sub-modules corresponding to various language specifications, and generates retrieval commands in accordance with the query language program name defined in the space object.

The program of the present invention is provided with the sub-modules corresponding to the language specifications of the SOAR retrieval program, developed by Software AG of Far East, Inc., the interactive SQL program, and the database function of HyperCard provided by Apple Computer Inc.

In the SOAR retrieval program, the set propositional logical formula, which is generated by the program of the present invention, can be entered in the SOAR-LQ program almost directly to execute processing. In the HyperCard database function, the positive and negative logical portions of the set propositional logical formula are replaced with separate marking instructions respectively for execution, and the resulting marked cards ultimately become the retrieved set.

In the following explanation, an example to convert the logical formula into retrieval instructions of the interactive SQL program is described.

The set creation object message (g-1) has the database file name defined in the space object as the base table name for retrieval, and generates a retrieval instruction (g-2).

(g-1) Example of the set creation object message
createSet 'A' where age>30 and age≦35.

(g-2) Example of the query instruction
SELECT COUNT(*) FROM EMP WHERE AGE≧30 AND AGE<35;

The set projection object message (g-3) has the database file name defined in the projecting space object as the base table name, generates a retrieval instruction (g-4) connecting the elements in a linkage field. And with the generated database table name and the formula defined in the original space object, the retrieval instruction (g-5) is synthesized.

(g-3) Example of the set projection object message
projectSet 'A' to employee.

(g-4) Example of the main retrieval instruction
SELECT COUNT (*), PERSONAL_NO, TECH_HISTORY.EMP_NO FROM EMP, TECH_HISTORY WHERE EMP.PERSONAL_NO=TECH_HISTORY.EMP_ID (g-5) Example of the set projection retrieval instruction, synthesized with the retrieval conditions of the original space object
SELECT COUNT (*), PERSONAL_NO, TECH_HISTORY.EMP_NO FROM EMP, TECH_HISTORY WHERE EMP.PERSONAL_NO=TECH_HISTORY.EMP_ID AND TECH_HISTORY.SYSTEM='UNIX';

The set extraction object message (g-6) generates the data selection instruction (g-7) from the field object description, generates the retrieval statement from the set object identifier, referring to the conditional attributes, and ultimately synthesizes one retrieval instruction (g-8).

(g-6) Example of the set extraction object message
readSet 'A'[personal_id, name, age, dept_no].

(g-7) Example of the data selection instruction
SELECT PERSONAL_NO, NAME, AGE, DEPT_CODE FROM EMP (g-8) Example of the set extraction retrieval instruction, synthesized with the data selection instruction.
SELECT PERSONAL_NO, NAME, AGE, DEPT_CODE FROM EMP WHERE AGE≧30 AND AGE<35;

When the object message (g-9) comprises the set propositional logical formula, the object message is converted to the set object identifier of the set propositional logical formula and to the SQL instruction corresponding to the set logical operator, and generates a query language statement (g-10). The set logical operator replaces the logical union '+' and the affirmative logic '<+>' with "UNION" or "OR", the logical difference '–' and the negative logic '<–>' with "MINUS", and the logical intersection '*' with "AND" or "INTERSECT."

(g-9) Example of the set creation object message in the set propositional logical formula
createSet 'E' with <+>'A'<−>(('A'*'B')+('A'*'C')).

(g-10) Example of the SQL statement
SELECT COUNT(*) FROM EMP WHERE AGE ≧30 AND AGE<35
MINUS
  ((SELECT COUNT(*) FROM EMP
    WHERE AGE≧30 AND AGE<35 AND YEARS>12)
UNION
  (SELECT COUNT(*) FROM EMP
    WHERE AGE≧30 AND AGE<35 AND PROJ_CODE IS NULL));

(h) Query language interface

The query language interface controls the transmitting/receiving processing between the query language program and the program of the present invention, via the interface of the communication lines or the piping function of the same computer systems.

The reserved terms are selected to retrieve and extract the records from the input/output status and response messages of the query language program, and are defined beforehand in the interface keyword table. In the interface keyword table, keywords, query language program names and reserved terms are defined. The instructions to the query language program are transmitted after confirming that the query language is ready for input from the prompt message (h-1).

The responses from the query language program comprise the count of records found and the data elements of the extracted sets. When receiving the count of records found, the reserved term (h-2) which denotes the count, is searched and extracted from the received text messages, and is transmitted to the requesting module. When receiving the data elements, the status to transmit the set extracting query language instruction is first recorded, and all the subsequent response messages are transmitted to the set extracting means until the next prompt message is issued.

(h-1) Example of the prompt message definition
prompt_ready,SOAR,"*TYPE COMMAND (M)"
prompt_ready,SQL,"SQL>"

(h-2) Example of the reserved term definition to describe the count of records found
count_receive,SOAR,"RECORDS FOUND"
count_receive,SQL,"records selected"

(i) Log record

The operation record and the communication record with the query language are kept with the below log header record.
nnn sss-LE: message
nnn ...-..: log line number
... sss-..: space object number
Message level
... ...-1.: main instruction object message
... ...-2.: sub-instruction object message
... ...-3.: communication message with the database query language
... ...-4.: tracing message
... ...-9.: message to confirm the content obtained from the message box
Message class code
... ...-.C: instruction
... ...-.I: tracing information
... ...-.W: warning
... ...-.E: exception in processing
... ...-.F: system failure
... ...-..: object message and communication message In the object message, the operational instruction of the control panel and the instructions between modules are written.

The addressing node name and the serial numbers of the communication messages are added to the communication message and the instruction transmitting message (i-1) and received responses (i-2) are recorded.

(i-1) Example of the instruction transmitting message
032 001-3S:Host:034:"SELECT COUNT(*)...;"

(i-2) Example of the received response
033 001-3R:Host:034:"200 records selected."

BRIEF DESCRIPTION OF THE DRAWINGS

FIG. 3 shows the style to describe the logical set as the rectangular area (shadowed area) and, (3-a) Intersection set of the set 'A' and set 'B' is described as 'A'*'B', (3-b) Union set of set 'A' and set 'B' is described as 'A'+'B', (3-c) Difference set of subtracting set 'B' from set 'A' is described as 'A'−('A'*'B') and, (3-d) Difference set of subtracting set 'A' and set 'B' from the mother set '#' is described as '#'−('A'+'B');

FIGS. 7a–7d shows the function of "set logical formula conversion" by the set selection means, when the area of each graph is selected (shadowed), the logical formula is displayed under the graph, which is then converted to the set propositional logical formula as in the latter part of '=';

DESCRIPTION OF THE PREFERRED EMBODIMENTS

The implementation of the present invention to retrieve the personnel information database is explained in the following section.

The personnel information database is built on the database management system in SQL, and it comprises an employee table "EMP" and a technical history table "TECH_HISTORY".

The employee table is defined in the space object "001" and the technical history table is defined in the space object "002"; and the "personal_id" of the space object "001" and the "emp_id" of the space object "002" are defined and connected in the space connecting statement.

The objective of retrieval is to "create a name list of the new project leader candidates," and the requirements of the candidates are analyzed as to "satisfy one of the requirements that the age is at 30 or above and below 35 whose length of employment is over 12 years, or that the age is at 30 or above and below 35 who are not assigned to any project, or that the length of employment is over 12 years who are not assigned to any project, and a further requirement is that they should have an experience of system development using "UNIX."" This stage normally involves mental work of the personnel staff based on his knowledge and experience in this area.

In the mental work in database retrieval operation, the attributes of the subject are analyzed to determine and describe the retrieval conditional formula. The attributes of the subject to be retrieved comprise the below four retrieval conditions as elements, and are structured with the combination of them.
(A) "the age is at 30 or above and below 35"
(B) "the length of employment is over 12 years"
(C) "those who are not assigned to any project at now"
(D) "development experience with UNIX"

In order to show the process, the log is written to record the object message.

Create a set object which satisfies the condition "the age at 30 or above and below 35". Enter the condition "age>30 and age≦35" in the message box and click the set creation button in the operation screen.
012 001-9I:create Set=:age>30 and age≦35
013 001-1C:createSet 'A' where age>30 and age≦35.
014 001-3S:Host:001:"SELECT COUNT(*) FROM EMP WHERE AGE≧30 AND AGE<35;"
015 001-3R:Host:001:"200 records selected."
016 001-2C:drawSet 'A' by rate.

Figure 1:
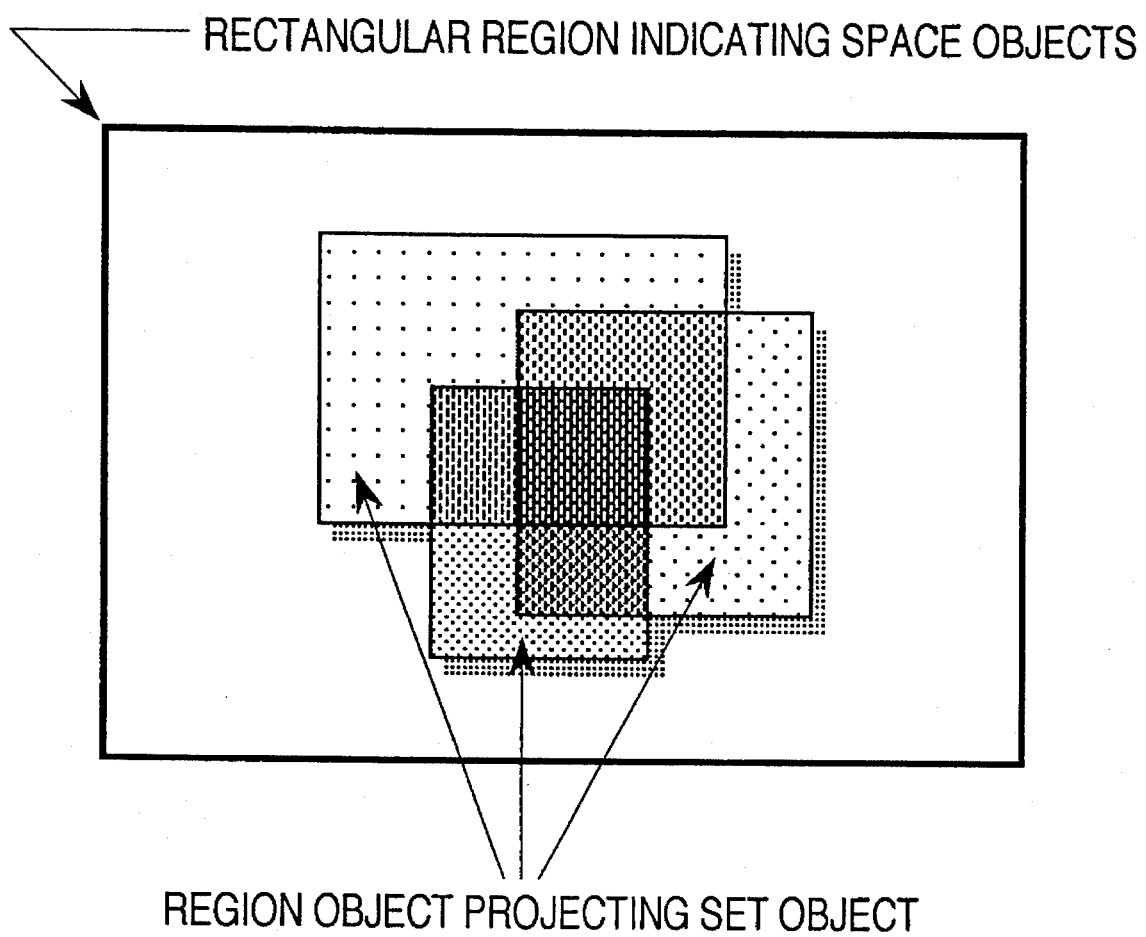
FIG. 1 shows "Set Graph"
Figure 2A:
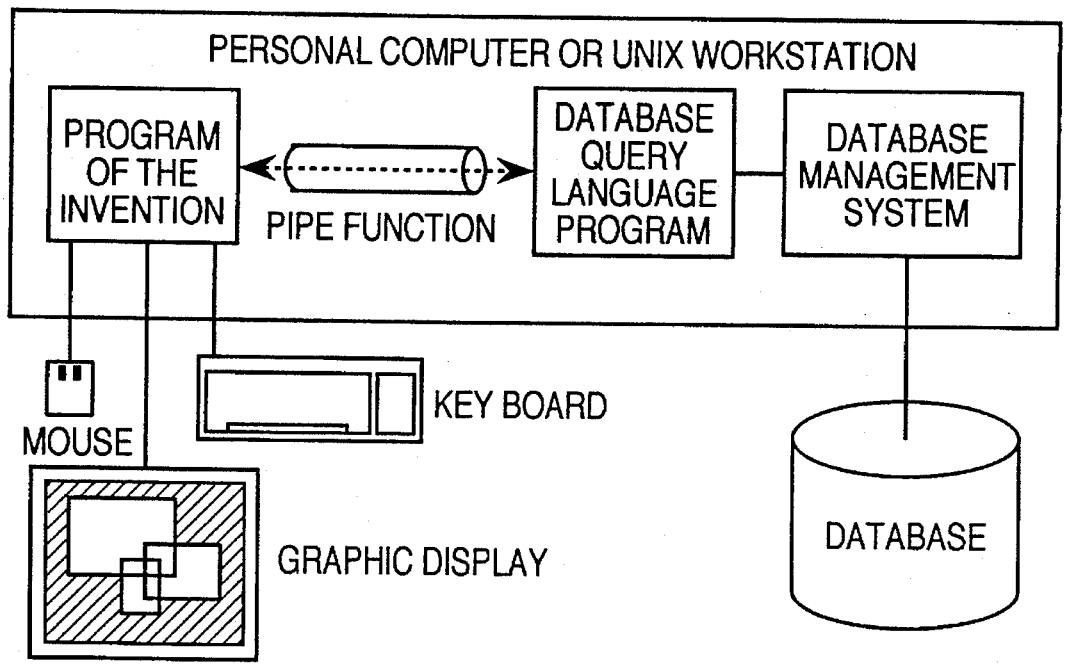
FIG. 2 shows the system configuration and, (2-a) Stand alone computer system configuration (2-b) System configuration connected with the host computer system.
Figure 2B:
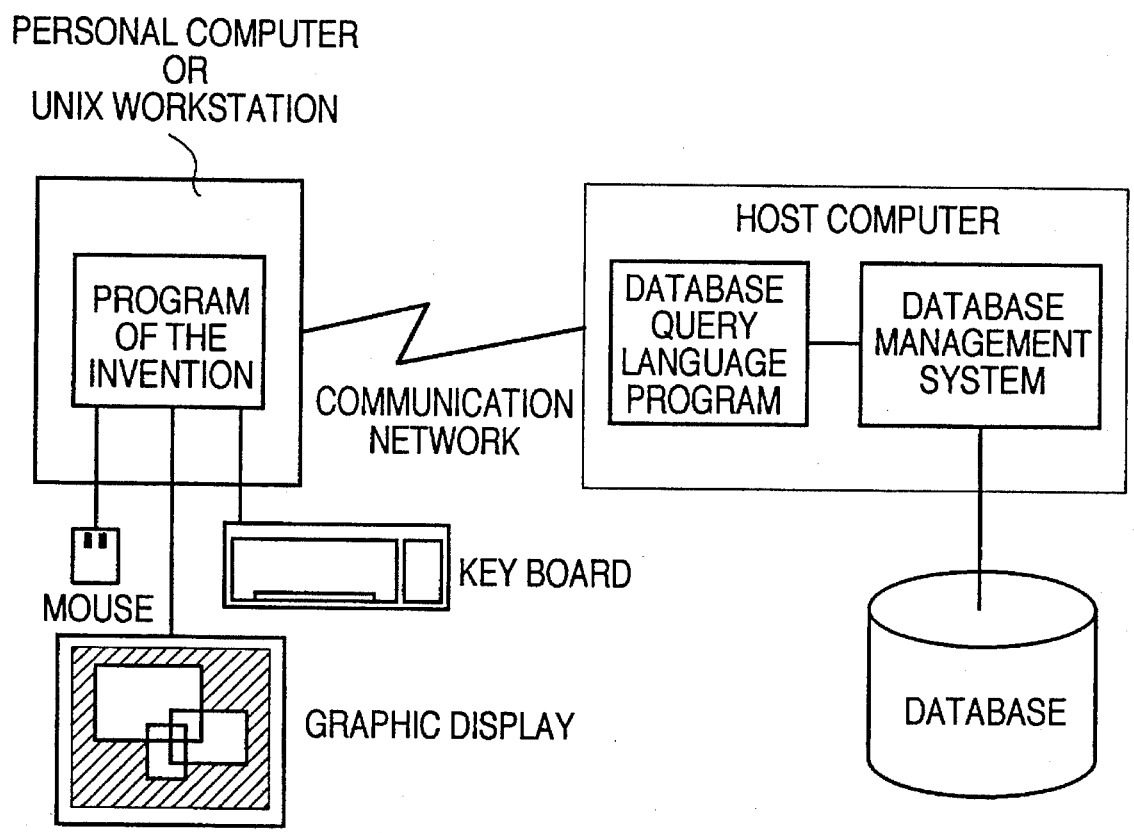
Figure 4A:
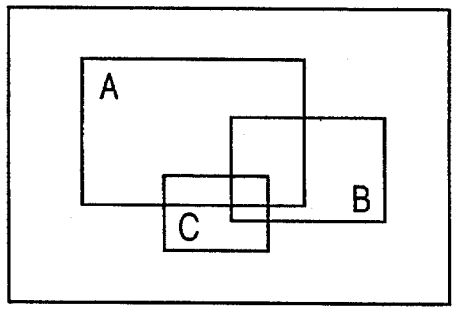
FIG. 4 shows the set graph layout variation where three sets are drawn and, (4-a) when 'A'*'B'≠0, 'A'*'C' ≠ 0, 'B'*'C'≠0, and 'A'*'B'*'C'≠0, there are 7 portions, (4-b) when 'A'*'B' ≠ 0, 'A'*'C'≠0, B'*'C'≠0, and 'A'*'B'*'C'=0, there are 6 portions, (4-c) when any one of 'A'*'B', 'A'*'C', 'B'*'C' equals '0', there are 5 portions, (4-d) when any two of 'A'*'B', 'A'*'C', and 'B'*'C' equal '0', there are 4 portions, (4-e) when all of 'A'*'B', 'A'*'C', and 'B'*'C' equal '0', there are 3 portions.
Figure 4B:
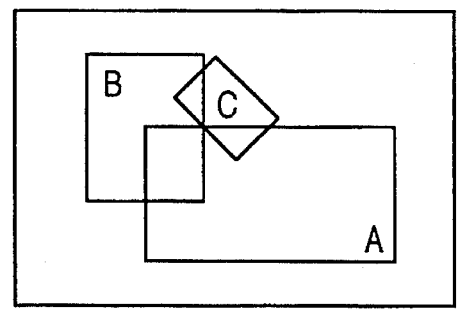
Figure 4C:
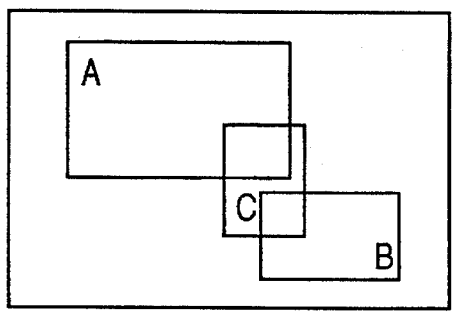
Figure 4E:
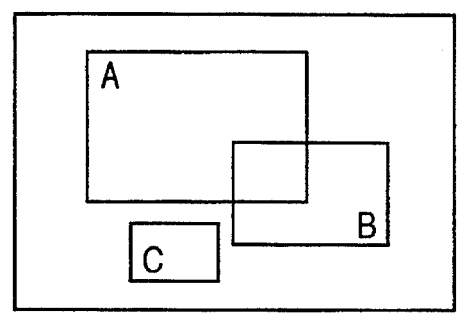
Figure 4E:
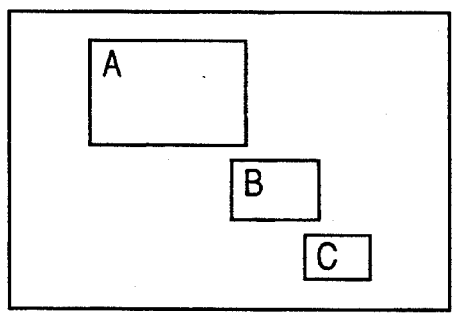
Figure 6:
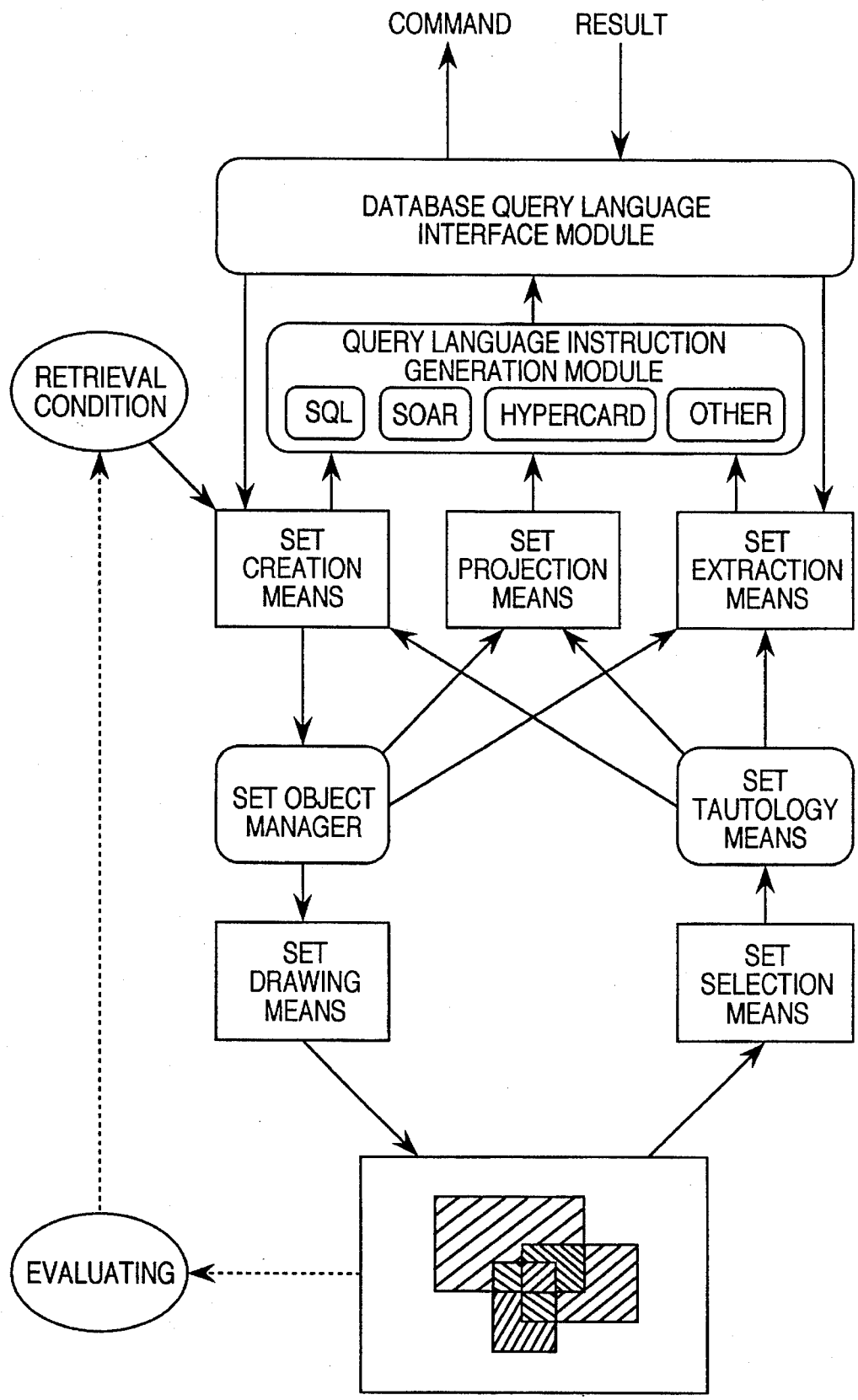
FIG. 6 shows the module structure of the program of the present invention and the processing procedure of the various means.
Figure 5:
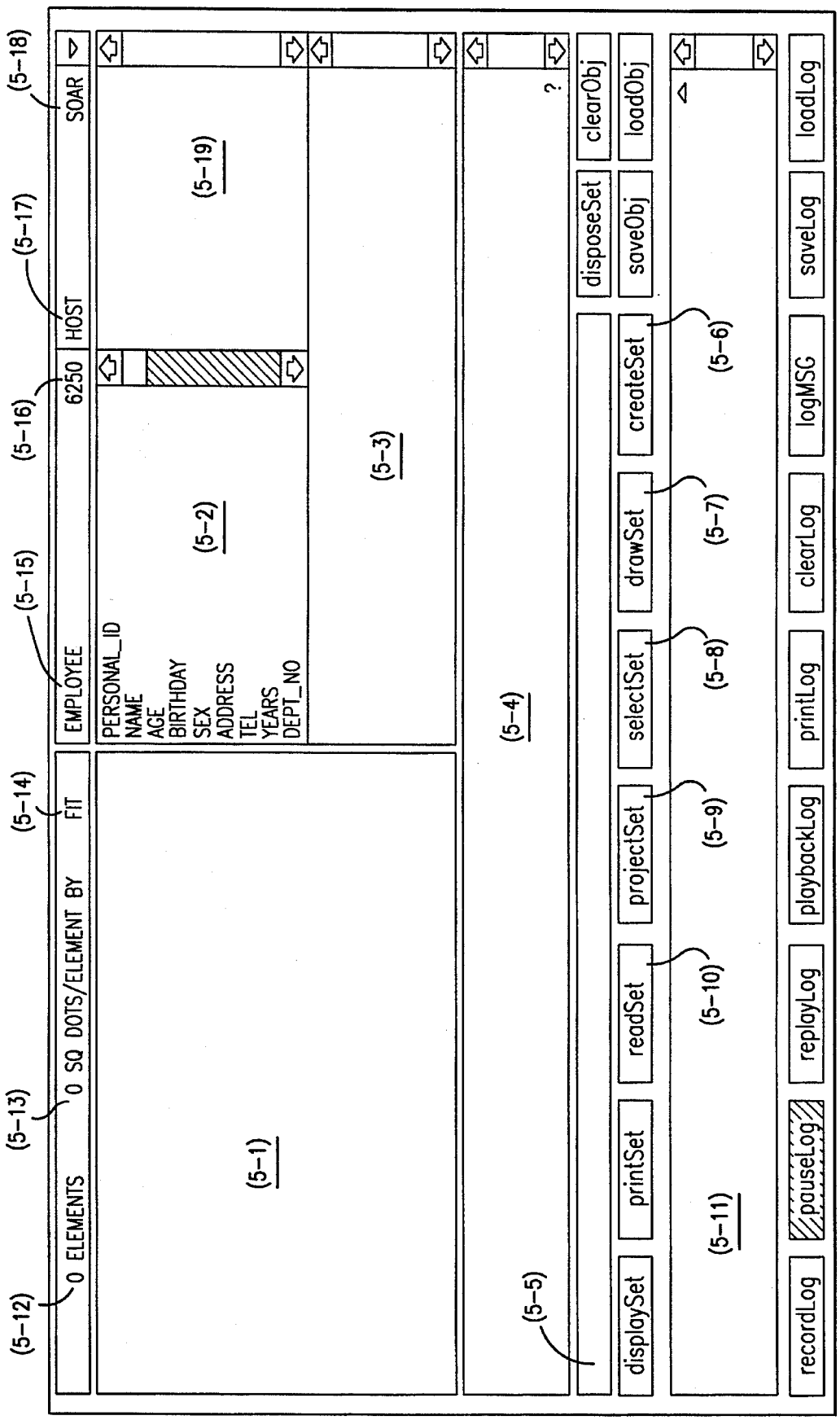
FIG. 5 shows an operation panel called "a control panel"
Figure 8:
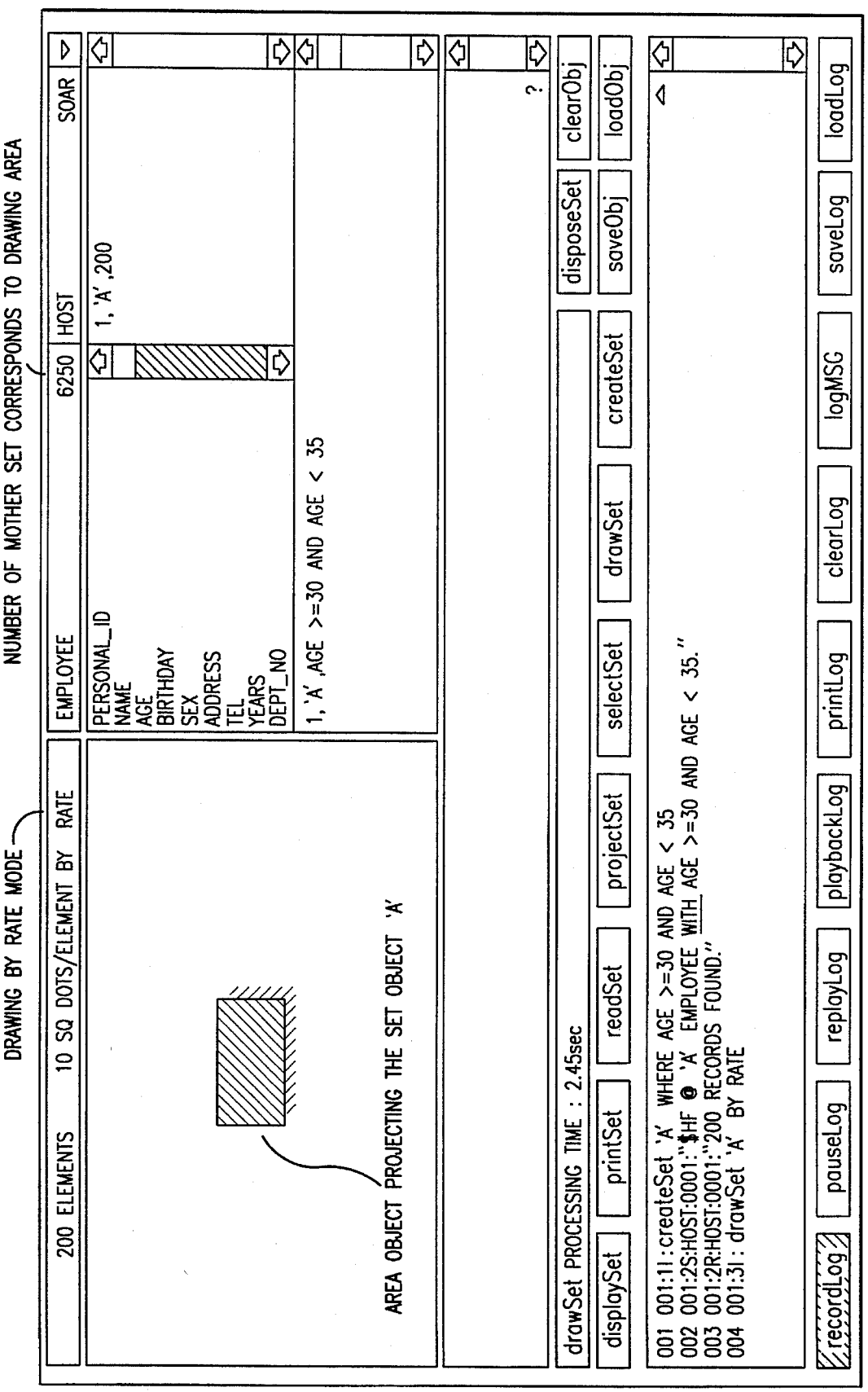
FIG. 8 shows the set graph in case of the implemented example, where the set object created after executing the set creation instruction is drawn in rate.

There are 200 records selected. The set object 'A' which satisfies "the age at 30 or above and below 35" is drawn as the set graph in the proportional mode as shown in FIG. 8.

Then create a set object 'B' which satisfies the condition "the length of employment is over 12 years."
017 001-9I:create Set=:years>12
018 001-1C:createSet 'B' where years>12.
019 001-3S:Host:002:"SELECT COUNT(*) FROM EMP WHERE YEARS>12;"
020 001-3R:Host:002:"150 records selected."
021 001-2C:drawSet 'B' by rate.

There are 150 records selected. The set object 'B' is registered and the set graph is drawn in the same manner.

Here, in order to confirm the relation between the set objects 'A' and 'B', the set graphs are drawn.
022 001-9I:draw Set=:'A','B'
023 001-1C:drawSet 'A','B' by fit.
024 001-2C:createSubset 'A'*'B'
025 001-3S:Host:003:"SELECT COUNT(*) FROM EMP WHERE AGE≧30 AND AGE<35 AND YEARS>12;"
026 001-3R:Host:003:"75 records selected."

Figure 9:
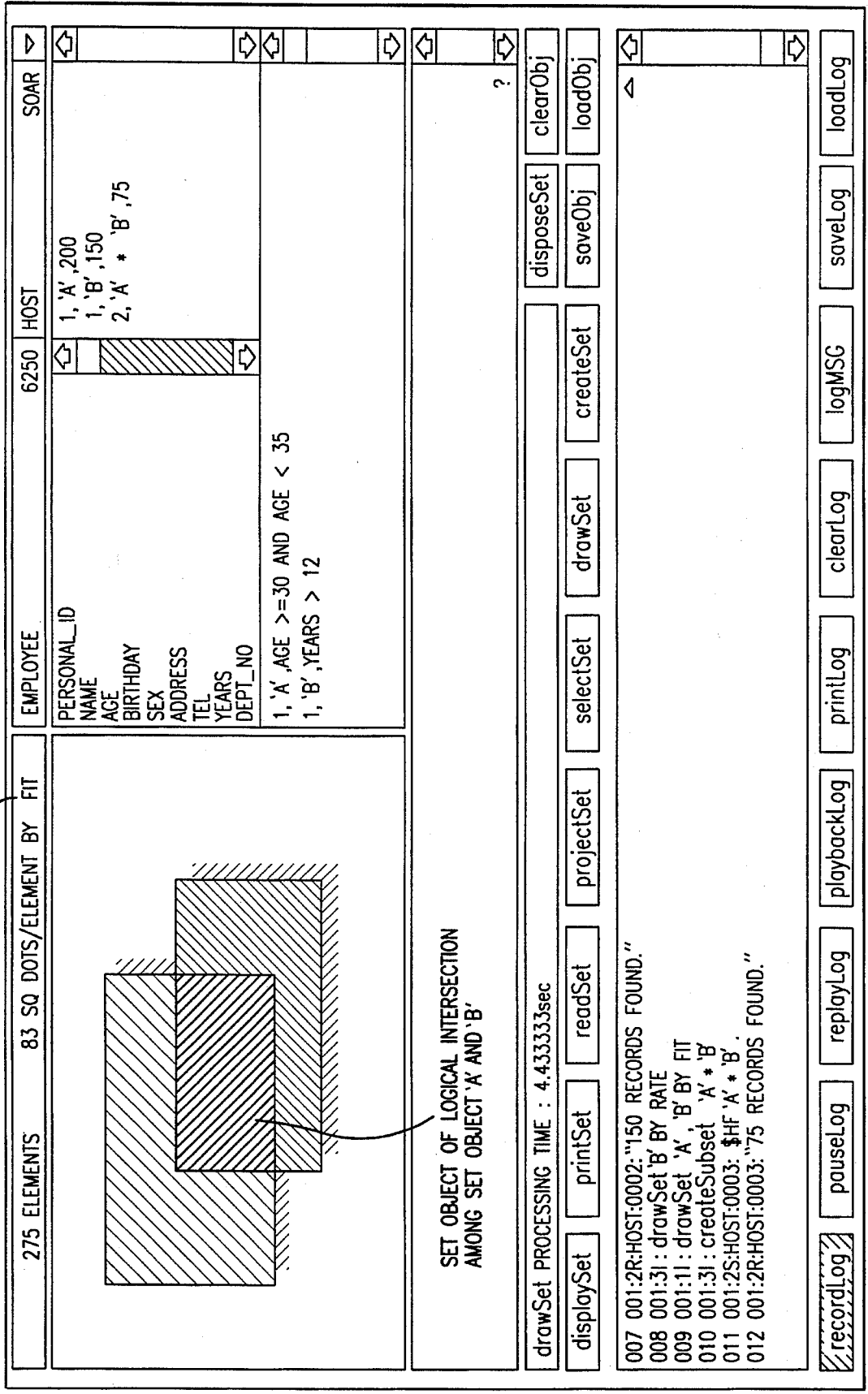
FIG. 9 shows a set graph of set objects 'A' and 'B' in the implemented example.

The number of the logical multiplication set of the set objects 'A' and 'B' is 75. As per shown in FIG. 9, the set graphs in the optimum mode are drawn, and it is confirmed that there are employees "whose age is at 30 or above and below 35, and the length of employment is over 12 years."

"Those who are not assigned to any project" means that they are not currently assigned to any project, and the records can be retrieved with the condition "proj_no is null." A set object 'C' is created as a result.
027 001-9I:create Set=:proj_no is null
028 001-1C:createSet 'C' where proj_no is null.
029 001-3S:Host:004:"SELECT COUNT(*) FROM EMP WHERE PROJ_CODE IS NULL;"
030 001-3R:Host:004:"100 records selected."
031 001-2C:drawSet 'C' by rate.

The records that satisfy the condition are 100. The set object 'C' is registered and the set graph is drawn.

The object of the proposition is the sum of each logical multiplication of the set objects of 'A' "the age is at 30 or above or below 35", 'B' "the length of employment is over 12 years", and 'C' "those who are not assigned to any project," and further the logical multiplication of the condition of "development experience using UNIX". Before creating a set of "those who have development experience using UNIX," draw set graphs with three set objects 'A', 'B' and 'C' that have been created so far.
032 001-9I:draw Set=:'A','B','C'
033 001-1C:drawSet 'A','B','C' by fit.
034 001-2C:createSubset 'A'*'C'.
035 001-3S:Host:005:"SELECT COUNT(*) FROM EMP WHERE AGE≧30 AND AGE<35 AND PROJ_CODE IS NULL;"
036 001-3R:Host:005:"50 records selected."
037 001-2C:createSubset 'B'*'C'.
038 001-3S:Host:006:"SELECT COUNT(*) FROM EMP WHERE YEARS>12 AND PROJ_CODE IS NULL;"
039 001-3R:Host:006:"50 records selected."
040 001-2C:createSubset 'A'*'B'*'C'.
041 001-3S:Host:007:"SELECT COUNT (*) FROM EMP WHERE AGE≧30 AND AGE<35 AND YEARS>12 AND PROJ_CODE IS NULL;"
042 001-3R:Host:007:"30 records selected."

The sub-set object 'A'*'C' has 50 records, 'B'*'C' has 50, and 'A'*'B'*'C' has 30 records.

Figure 10:
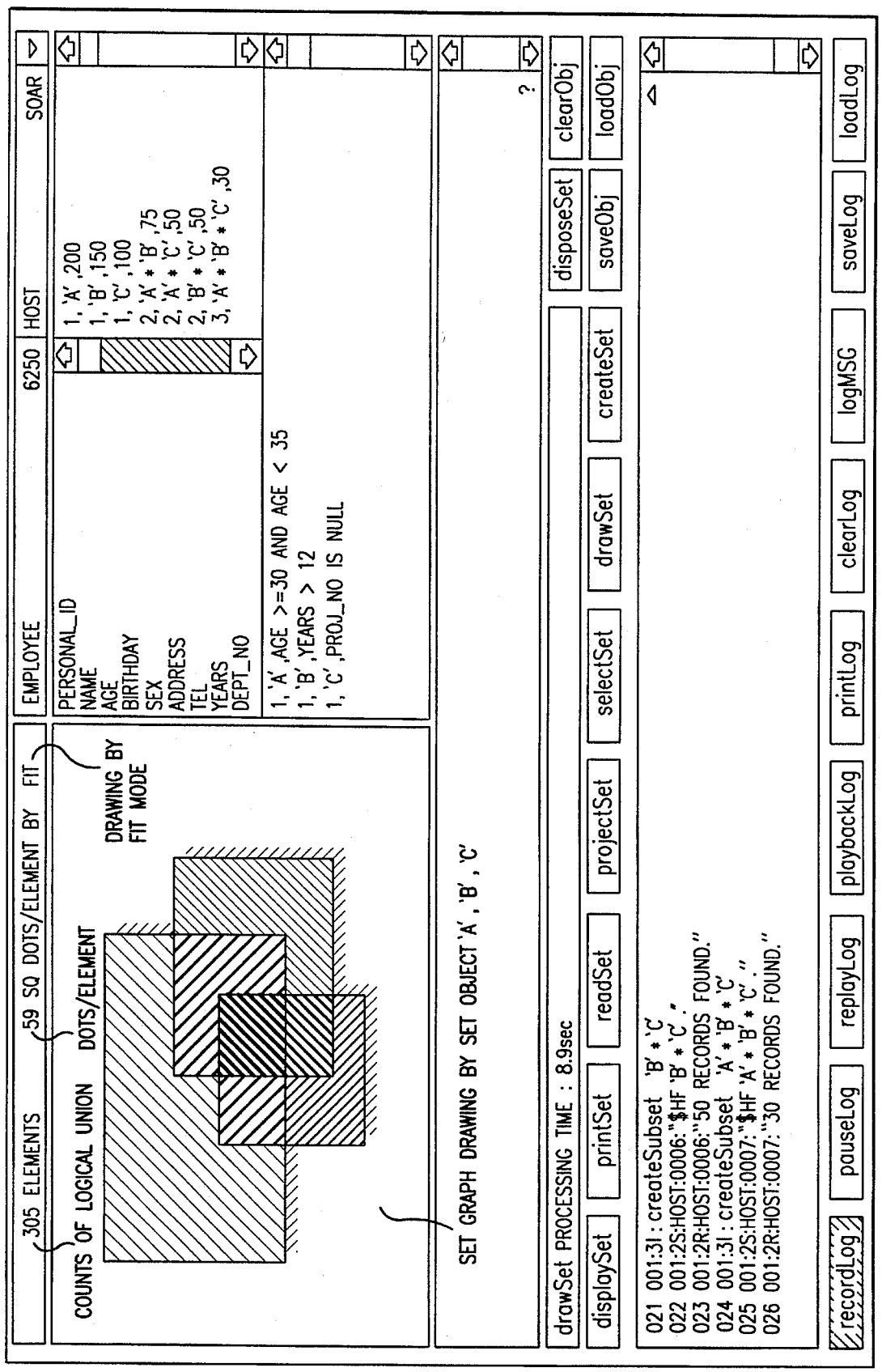
FIG. 10 shows a set graph of the set objects 'A', 'B' and 'C' in the implemented example.

As a result, as shown in the set graphs in FIG. 10, it is confirmed that three sets have a portion where all three graphs cross.

The area ('A'*'B') shows the logical intersection set of the "age at 30 or above and below 35 whose length of employment is over 12 years," the area ('A'*'C') shows the logical intersection set that "the age is at 30 or above and below 35 who are not assigned to any project", and the area ('B'*'C') shows the logical intersection set of "the length of employment is over 12 years who are not assigned to any project." And the area ('A'*'B'*'C') shows the logical intersection set of "the age is 30 or above and below 35, whose length of employment is over 12 years and who are not assigned to any project," and this set is to be eliminated from the subject for further retrieval.

Figure 11:
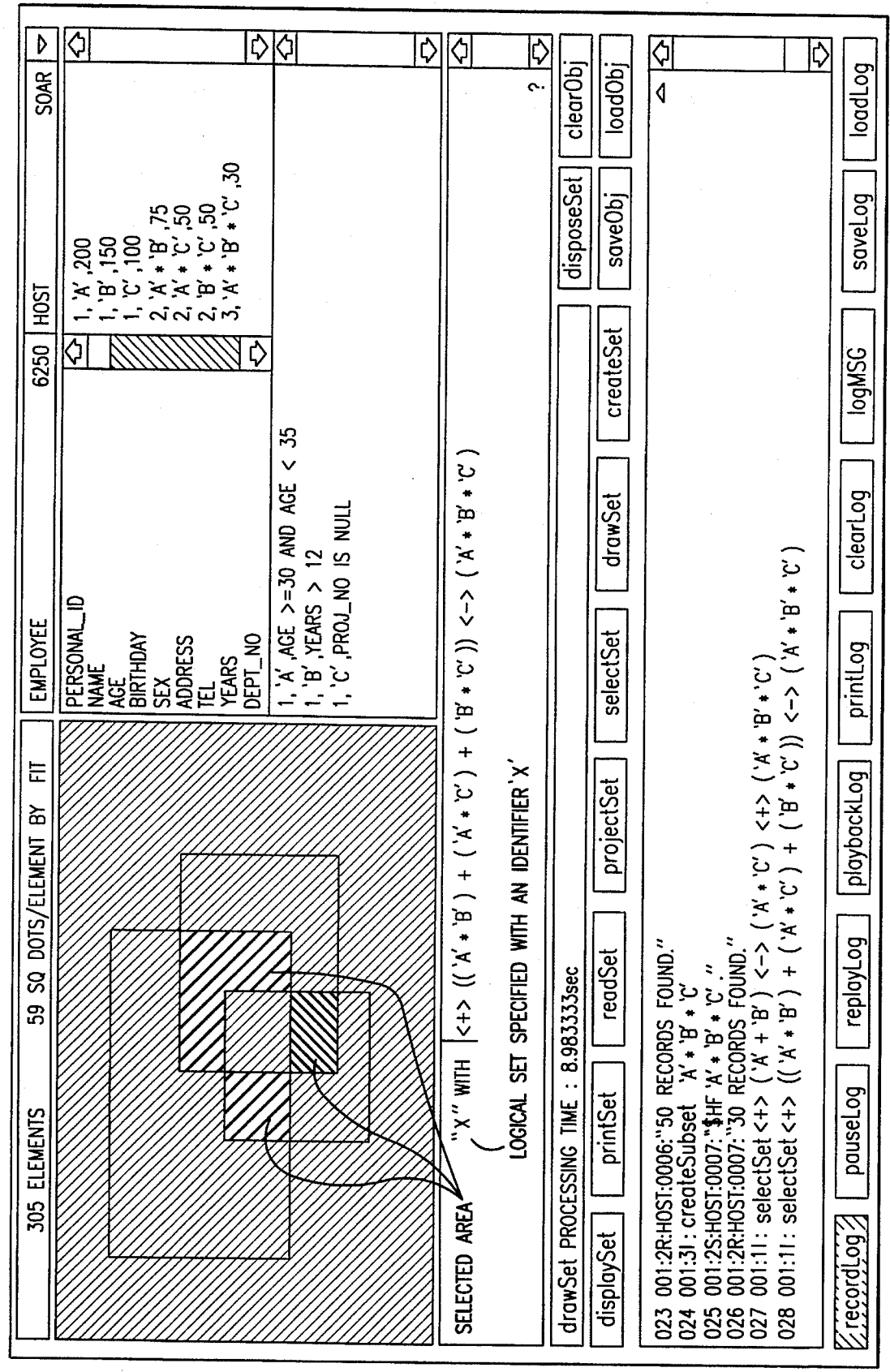
FIG. 11 shows the cut portion of the selected set graph when the deductive set object "X" is created in the implemented example.

Select the region object portions (('A'*'B')–('A'*'B'*'C')), (('A'*'C')–('A'*'B'*'C')), (('B'*'C')–('A'*'B'*'C')), and create one deductive logical object. Clock and select the regions in the set graphs, shown in FIG. 11, then click the set selection button, to create a set propositional logical formula.

043 001-9I:select Set=:(('A'*'B')–('A'*'B'*'C'))+ (('A'*'C')–('A'*'B'*'C'))+(('B'*'C')–('A'*'B'*'C'))=85
044 001-1C:selectSet<+>(('A'*'B')+('A'*'C')+('B'*'C'))<–>('A'*'B'*'C')

In order to register this logical set as the deductive set object explicitly specified with an identifier "X", move a carsel before the set propositional logical formula displayed in the message box and enter '"X" with'.

045 001-9I:create Set=:"X" with<+>(('A'*'B')+('A'*'C')+('B'*'C'))<–>('A'*'B'*'C')
046 001-1C:createSet "X" with <+>(('A'*'B')+('A'*'C')+('B'*'C'))<–>('A'*'B'*'C')
047 001-3S:Host:008:"((SELECT COUNT(*) FROM EMP WHERE AGE≧30 AND AGE<35 AND YEARS>12)
UNION
(SELECT COUNT(*) FROM EMP WHERE AGE≧30 AND AGE<35 AND PROJ_CODE IS NULL)
UNION
(SELECT COUNT(*) FROM EMP WHERE YEARS≧12 AND PROJ_CODE IS NULL))
MINUS
(SELECT COUNT(*) FROM EMP WHERE AGE≧30 AND AGE<35 AND YEARS>12 AND PROJ_CODE IS NULL);"
048 001-3R:Host:008:"85 records selected."

Thus the deductive set object "X" is registered.

The condition of "development experience using UNIX" is used to retrieve the employee number who has 'UNIX' in the h_keyword field in the personal_history space object, to obtain an employee number set projected to the employee space object.

First click the space object name to display the space object browser, and select the personal_history space object.

049 001-9I:select Space=:personal_history
050 001-1C:selectSpace personal_history.

Create a set object which satisfies the condition "development experience using UNIX".

051 002-9I:create Set=:h_keyword='UNIX'
052 002-1C:createSet 'A' where h_keyword='UNIX'.
053 002-3S:Host:009:"SELECT COUNT(*) FROM TECH_HISTORY WHERE SYSTEM='UNIX',".
054 002-3R:Host:009:"625 records selected.".
055 002-2C:drawSet 'A' by rate.

The records satisfied are 625. The employee set of "development experience using UNIX" is registered in the set object 'A' in the personal_history space object.

In order to project the created set object 'A' in the employee space, select it from the set object browser.

056 002-9I:project Set=:'A'

Figure 12:
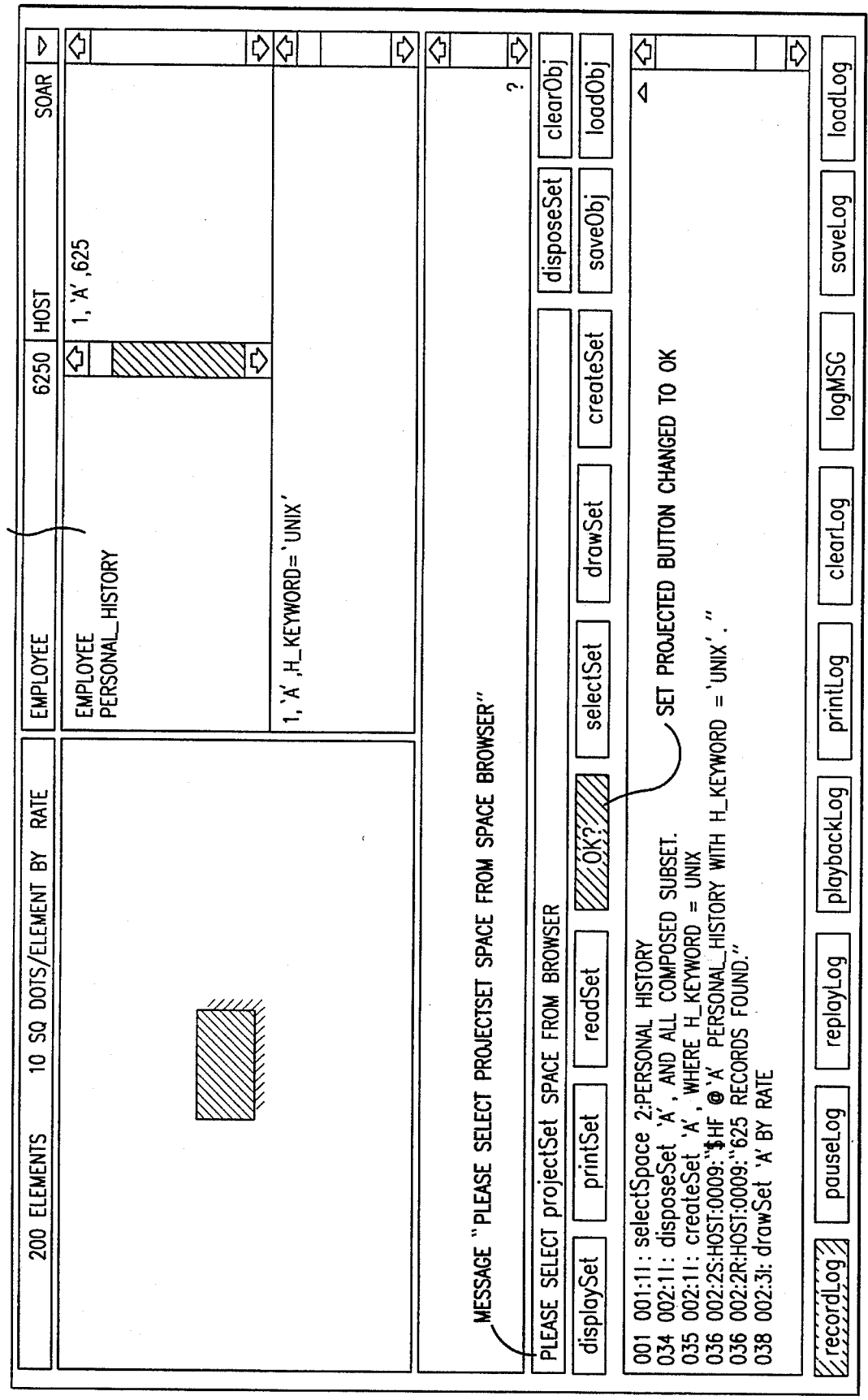
FIG. 12 shows the status when the set projection button is clicked and changed to "OK?" button, and the space object browser is displayed in case of the implemented example.

As shown in FIG. 12, the set projection button (projectSet) changes to "OK?" and a message "Select the space to project the set from the space object browser" is displayed in the notifying field. Click the employee to select.

057 002-9I:project Space=:employee.
058 002-1C:projectSet 'A' to employee.
059 002-2C:selectSpace employee.
060 001-3S:Host:010:"SELECT COUNT(*), TECH_HISTORY.EMP_NO FROM EMP, TECH_HISTORY WHERE TECH_HISTORY.SYSTEM='UNIX' AND EMP.PERSONAL_NO=TECH_HISTORY.EMP_NO;".
061 001-3R:Host:010:"120 records selected."

The set object 'A' of the personal_history space is projected in the employee space object, and is registered as the set object 'D'. The number of records in the set projected in the employee space is 120.

Draw set graphs, specifying the deductive set object "X" previously created and the projected set object "D".

062 001-9I:draw Set=:"X",'D'
063 001-1C:drawSet "X",'D' by fit.
064 001-2C:createSubset "X",'D'.
065 001-4I:"X"*'D' exploded to <+>(('A'*'B'*'D')+('A'*'C'*'D')+('B'*'C'*'D'))<–>('A'*'B'*'C'*'D')
066 001-3S:Host:011:"((SELECT COUNT(*), TECH_HISTORY.EMP_NO FROM EMP, TECH_HISTORY WHERE AGE≧30 AND AGE<35 AND YEARS>12 AND TECH_HISTORY.SYSTEM='UNIX' EMP.PERSONAL_NO=TECH HISTORY.EMP_NO)
UNION
(SELECT COUNT(*), PERSONAL_NO, TECH_HISTORY.EMP_NO FROM EMP, TECH_HISTORY WHERE AGE≧30 AND AGE<35 AND PROJ_CODE IS NULL AND TECH_HISTORY.SYSTEM='UNIX' AND EMP.PERSONAL_NO=TECH_HISTORY.EMP_NO)
UNION
(SELECT COUNT(*), PERSONAL_NO, TECH_HISTORY.EMP_NO FROM EMP, TECH_HISTORY WHERE YEARS>12 AND PROJ_CODE IS NULL AND TECH_HISTORY.SYSTEM='UNIX' AND EMP.PERSONAL_NO =TECH_HISTORY.EMP_NO))
MINUS
(SELECT COUNT(*), TECH_HISTORY.EMP_NO FROM EMP, TECH_HISTORY WHERE AGE≧30 AND AGE<35 AND YEARS>12 AND PROJ_CODE IS NULL AND TECH_HISTORY.SYSTEM='UNIX' AND EMP.PERSONAL_NO=TECH_HISTORY.EMP_NO);"
067 001-3R:Host:011:"23 records selected."

Figure 13:
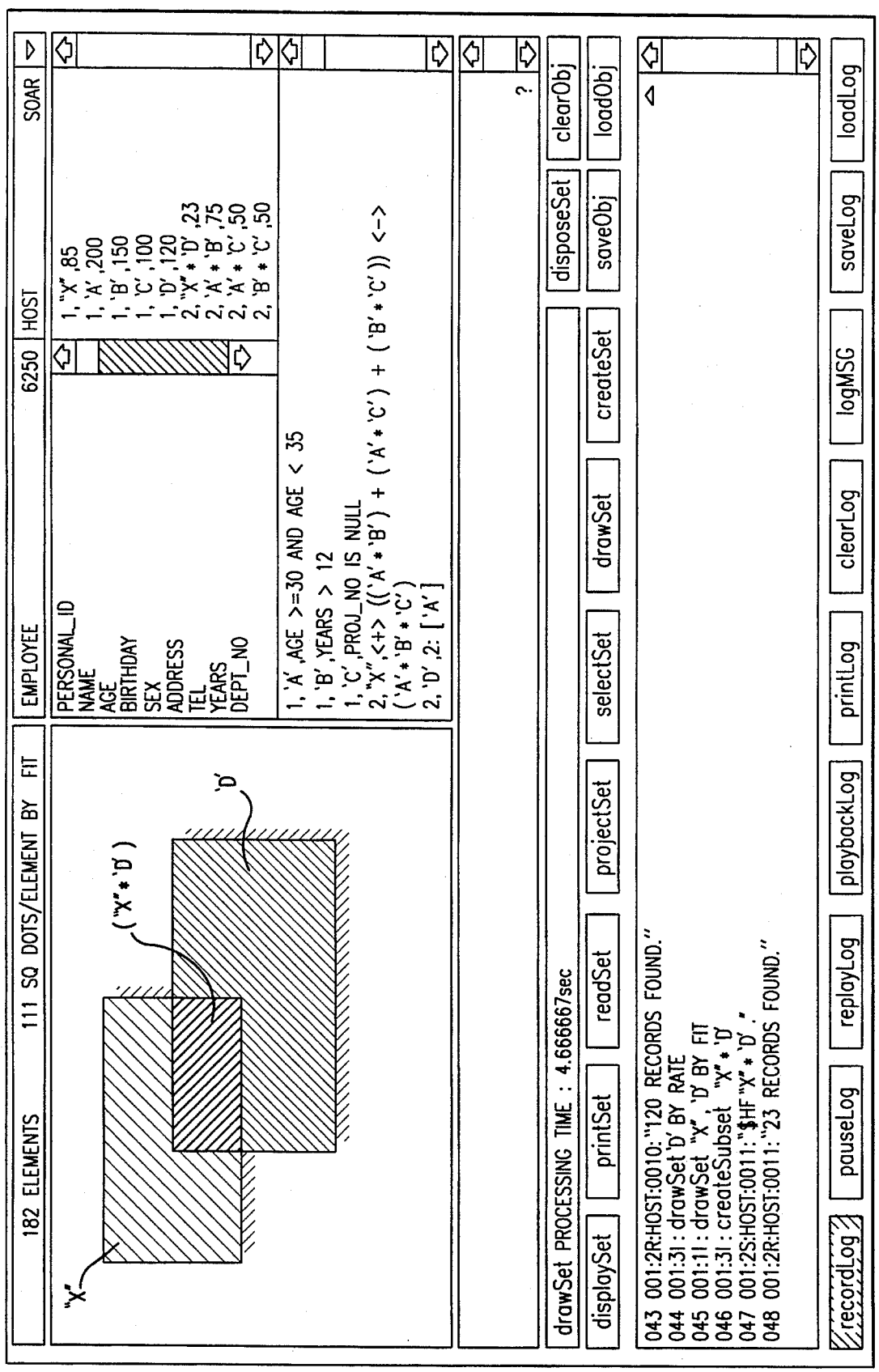
FIG. 13 shows the set graph of the deductive set object "X" and projected deductive set object 'D' in the implemented example.

The number of records of the logical multiplication set of "X" and 'D' is 23. As a result, the set graphs shown in FIG. 13 are drawn. "X"*'D' is a set of employees "who satisfy one of the conditions that the age is at 30 or above or below 35 whose length of employment is over 12, or that the age is 30 or above and below 35 who are not assigned to any project, or that those whose length of employment is over 12 years and who are not assigned to any project, and further those who have development experience using UNIX."

In order to make a name list of the subject, extract the employee numbers, names, ages, department numbers of the set "X"*'D'.

068 001-9I:select Set=:("X"*'D')=23
069 001-4I:"X"*'D' exploded to <+>(('A'*'B'*'D')+('A'*'C'*'D')+('B'*'C'*'D'))<–>('A'*'B'*'C'*'D')
070 01-1C:selectSet <+>(('A'*'B'*'D')+('A'*'C'*'D')+('B'*'C'*'D'))<–>('A'*'B'*'C'*'D')

Select the area object "X"*'D', and click the set selection button.

071 01-9I:read Set=:<+>(('A'*'B'*'D')+('A'*'C'*'D')+('B'*'C'*'D'))<–>('A'*'B'*'C'*'D')

Then, click the read set button while the set propositional logical formula is displayed in the message box.

Figure 14:
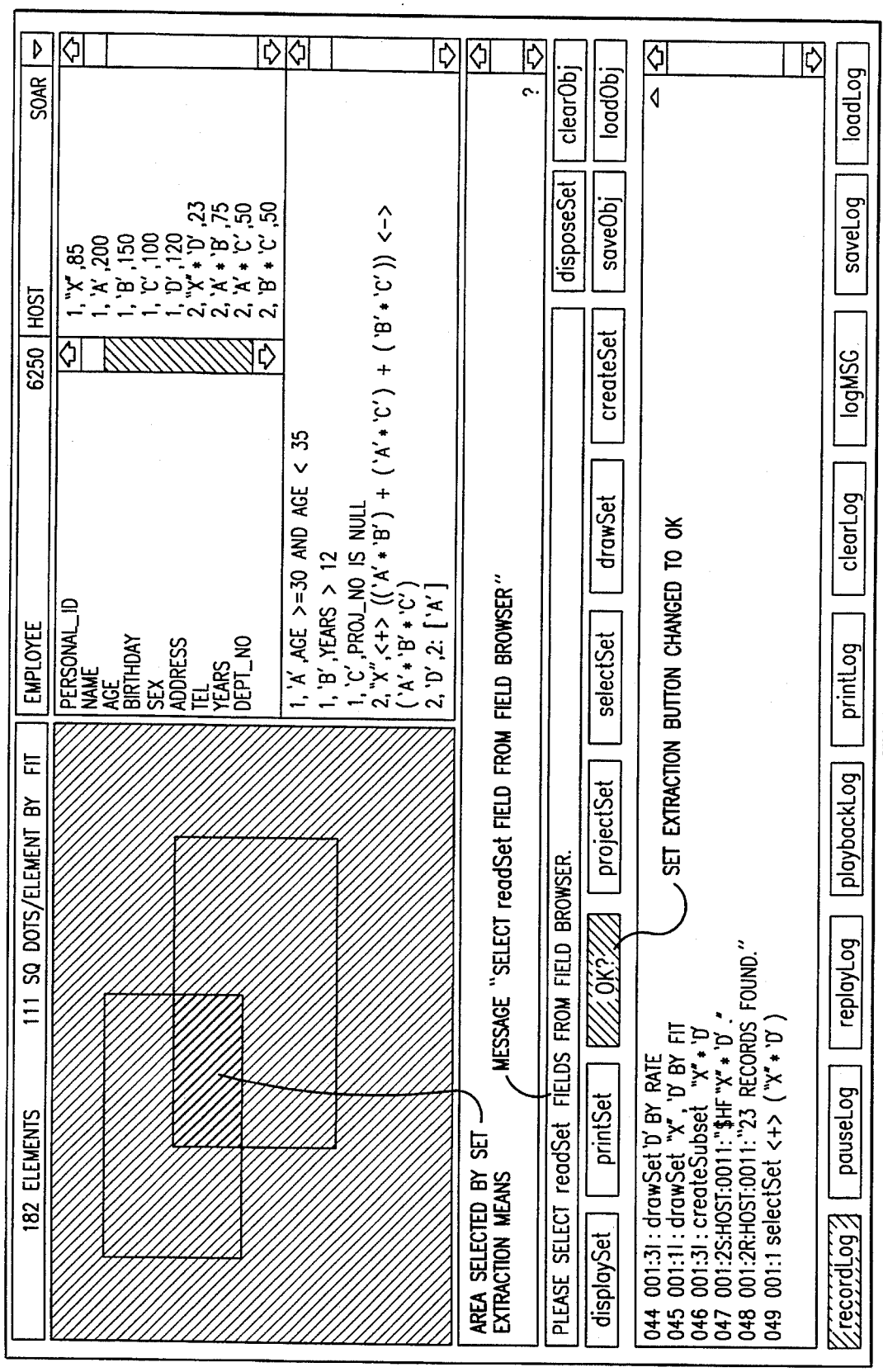
FIG. 14 shows the status when the read set button is clicked and changed to "OK?" button in the implemented example.

As shown in FIG. 14, the read set button (readSet) changes to "OK?" and a message "Select a group of fields to extract from the field object browser" is shown in the notifying field. Click the fields to be extracted, from the field object browser.

072 001-9I:read Items=:personal_id, name, age, dept_no,
073 001-1C:readSet <+>(('A'*'B'*'D')+('A'*'C'*'D')+('B'*'C'*'D'))<–>('A'*'B'*'C'*'D') [personal_id, name, age, dept_no ].
074    001-3S:Host:012:"((SELECT    PERSONAL_NO, NAME, AGE, DEPT_CODE TECH_HISTORY.EMP_NO FROM EMP, TECH_HISTORY WHERE AGE≧30 AND AGE<35 AND YEARS>12 AND TECH_HISTORY.SYSTEM='UNIX' EMP.PERSONAL_NO=TECH_HISTORY.EMP_NO)
UNION
(SELECT PERSONAL_NO, NAME, AGE, DEPT_CODE, TECH_HISTORY.EMP_NO FROM EMP, TECH_HISTORY WHERE AGE≧30 AND AGE<35 AND PROJ_CODE IS NULL AND TECH_HISTORY.SYSTEM='UNIX' EMP.PERSONAL_NO=TECH_HISTORY.EMP_NO)
UNION
(SELECT PERSONAL_NO, NAME, AGE, DEPT_CODE, TECH_HISTORY.EMP_NO FROM EMP, TECH_HISTORY WHERE YEARS>12 AND PROJ_CODE IS NULL AND TECH_HISTORY.SYSTEM='UNIX' EMP.PERSONAL_NO=TECH_HISTORY.EMP_NO))
MINUS
(SELECT PERSONAL_NO, NAME, AGE, DEPT_CODE, TECH_HISTORY.EMP_NO FROM EMP, TECH_HISTORY WHERE AGE≧30 AND AGE<35 AND YEARS>12 AND PROJ_CODE IS NULL AND TECH_HISTORY.SYSTEM='UNIX' EMP.PERSONAL_NO=TECH_HISTORY.EMP_NO);
075 001-3R:Host:012:"ready for output"

Figure 15:
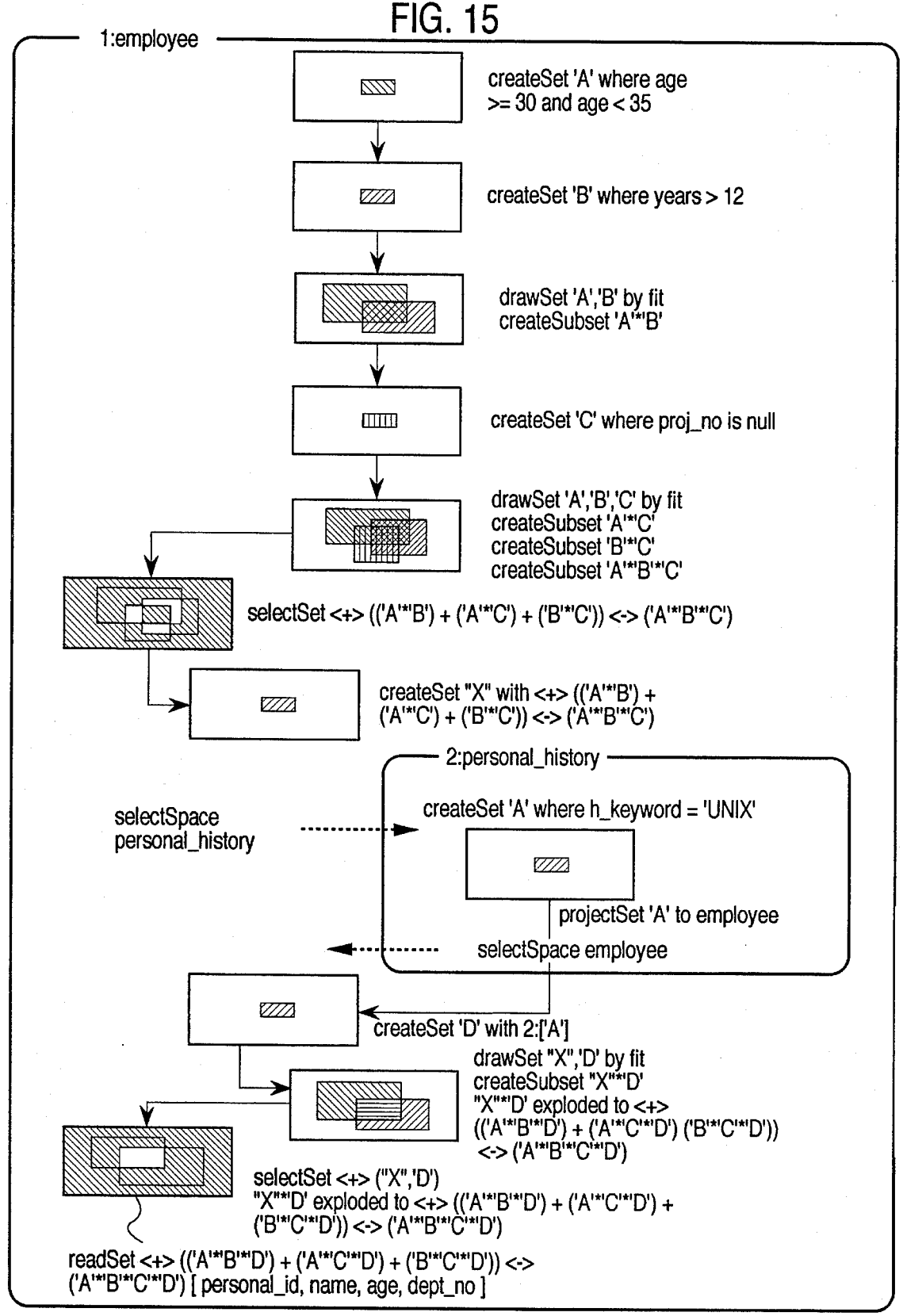
FIG. 15 shows the phased operational flow of the "Geometric Set'Graph Method for Database Retrieval" in the implemented example.

As explained in the above example, "the database retrieval method through set graph" realizes retrieval processing with the use of the graphical user interface to select and point the graphic objects, except the basic conditional formula of the set objects described through the phased operational flow (FIG. 15) which follows the logical way of human thinking.

The present invention brings about the below effects, by way of displaying the sets projected in the geometric rectangular shapes,
(a) to evaluate and recognize visually the quantity of the sets and logical relation between the sets from the size and layout of the geometric rectangular shapes,
(b) to realize data retrieval manipulation by creating 255 different retrieval conditional formulae, with the instruction of selecting combinations of the sets from eight logical sets, including a maximum of seven regional portions and the surrounding mother set, which are drawn with three rectangular regions, and
(c) to use the set graphs for comparing the sets with the time scale as well as for better explanation and presentation, because the quantity and relation of the abstract existence of the sets are recorded and shown as graphs.

In the database retrieval, such as information and documentation retrieval, the object of retrieval is not always clearly grasped, so under an uncertain and unclear tentative condition, retrieval processing is normally repeated on a trial and error basis. In such a retrieval processing, groping for the object itself under various retrieval conditions is meaningful, and retrieval is executed with a comparatively simple formula, and the sets are created and the object of retrieval is understood from the logical relation of those sets manipulated with a combination of the created sets using the boolean operators.

Furthermore, in case of the database retrieval of the personnel or management information, the best condition for retrieval can be obtained through describing complex conditions against multiple database files and make combinations of the sets obtained from the assumed multiple conditional values.

Such type of retrieval is very important and often found difficult to achieve because the logical challenge to understand the logical relation between the sets is more difficult than the technical challenge in computer manipulation. Therefore, it is still often observed that the user himself draws circles to show the sets on a sheet of paper to try to understand the relation of the sets from the drawing, and that after such manipulation, he can finally return to the keyboard of the computert to enter the retrieval conditions.

The present invention provides an integrated solution for the technical problem in the course of operation as well as for the logical problem in the human thinking, in highly complex retrieval processing or uncertain and unclear retrieval processing.

What is claimed is:

1. A database retrieval method comprising the steps of:
 a) selecting a first space object database;
 b) creating a plurality of set objects for retrieval of data from said space object database;
 c) displaying a visual representation of said plurality of set objects, wherein said display gives overlapping areas of said visual representation when data in said set objects is the same;
 d) selecting one or more areas of said display; and
 e) extracting data from said space object which is within said one or more areas selected.

2. The retrieval method of claim 1 wherein said plurality of sets does not exceed three.

3. The retrieval method of claim 1 further comprising the step of displaying a number of hit elements within one or more areas of said display.

4. The retrieval method of claim 1 further comprising the steps of:
 pre-registering set object definitions, and
 selecting at least one of said created plurality of set objects by selecting said pre-registered set object definitions.

5. The retrieval method in accordance with claim 2 wherein a count of each of said created set objects is displayed on a screen of a graphical display unit.

6. The retrieval method in accordance with claim 1 wherein said visual representation display shows a logical relationship among the created set objects.

7. The retrieval method in accordance with claim 6 wherein said visual representation display is a geometric rectangular region.

8. The retrieval method in accordance with claim 6 further comprising the step of displaying a logical statement of the relationship of the created set objects.

9. The retrieval method in accordance with claim 1 further comprising the steps of:
 creating a first data base set object from said extracted data of said first data base;
 selecting a second space object data base;
 creating a second data base set object which is defined by one or more set objects selected from said second data base;

creating a first visual display of said first data base set object;

creating a second visual display of said second data base set object;

displaying a visual representation of said first visual display of said first data base set object and of said second visual display of said second data base set object; and extracting data from said first and second data bases which is within one or more areas selected from said first visual display of said first data base set object and of said second visual display of said second data base set object.

10. The retrieval method in accordance with claim 1 wherein said visual representation is drawn in a mode selected from the group consisting of rate, fit, and zoom.

11. A database retrieval apparatus comprising:

a) a means for selecting a space object database;

b) a means for creating a plurality of set objects for retrieval of data from said space object database;

c) a means for displaying a visual representation of said plurality of set objects, wherein said display gives overlapping areas of said visual representation when data in said set objects is the same;

d) a means for selecting one or more area of said display; and e) a means for extracting data from said space object which is within said one or more areas selected.

12. The retrieval apparatus of claim 11 wherein said plurality of sets does not exceed three.

13. The retrieval apparatus of claim 11 further comprising a means for displaying a number of hit elements within one or more areas of said display, and said space object.

14. The retrieval apparatus of claim 11 further comprising:

a means for pre-registering set objects, and a means for selecting at least one of said created set of objects by selecting said pre-registered set object.

15. The retrieval apparatus in accordance with claim 11 wherein a count of said created set objects is displayed on a screen of a graphical display unit.

16. The retrieval apparatus in accordance with claim 11 wherein said display shows a logical relationship among the created set objects.

17. The retrieval apparatus in accordance with claim 16 wherein said display is a geometric rectangular region.

18. The retrieval apparatus in accordance with claim 16 further comprising a means for displaying a logical statement of the relationship of the created set objects.

19. The retrieval apparatus in accordance with claim 11 further comprising:

a means for creating another set object from a space object database;

a means for creating another set object which is defined by the one or more areas selected when logically combined;

a means for displaying a visual display of said another set object obtained from a space object database;

a means for displaying a visual display of said object which is defined by one or more areas selected when logically combined;

a means for selecting one or more areas of said second visual display; and a means for extracting data from said space object which is within one or more areas selected from said second visual display.

20. The retrieval apparatus according to claim 11 wherein said visual representation is drawn in a mode selected from the group consisting of rate, fit, and zoom.

\* \* \* \* \*

UNITED STATES PATENT AND TRADEMARK OFFICE
CERTIFICATE OF CORRECTION

PATENT NO. : 5,592,663
DATED : Jan. 7, 1997
INVENTOR(S) : Nobuhiko Nagamori

It is certified that error appears in the above-indentified patent and that said Letters Patent is hereby corrected as shown below:

On the title page, item [75]: should read

Inventor: Nobuhiko Nagamori, 5-5-103
Kunugidaidanchi, 1404
Kawashima-cho, Hodogaya-ku
Yokohama-shi, Kanagawa 240, Japan Signed and Sealed this Eighth Day of April, 1997

Attest:

BRUCE LEHMAN

*Attesting Officer*  *Commissioner of Patents and Trademarks*